Dec. 11, 1934.                    C. DREXLER                    1,983,841
                LOCK-OUT LEVER MECHANISM FOR FREEWHEELING UNITS
                    Filed Oct. 9, 1931        2 Sheets-Sheet 1
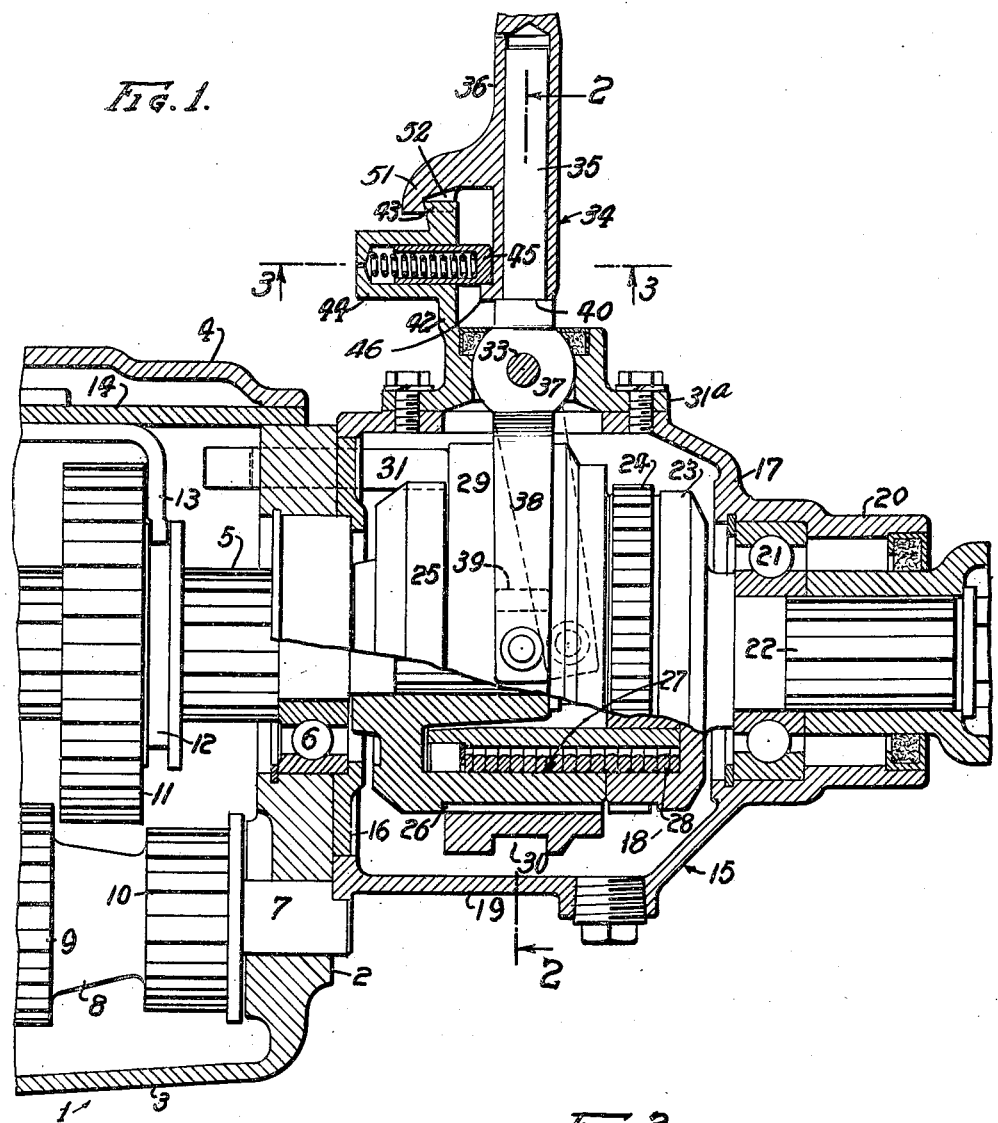
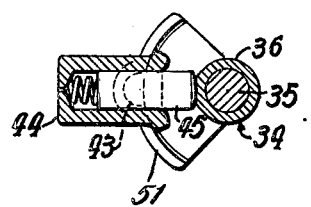
Inventor:
Charles Drexler,
By: Arthur M. Nelson
Atty.

Dec. 11, 1934.  C. DREXLER  1,983,841
LOCK-OUT LEVER MECHANISM FOR FREEWHEELING UNITS
Filed Oct. 9, 1931  2 Sheets-Sheet 2
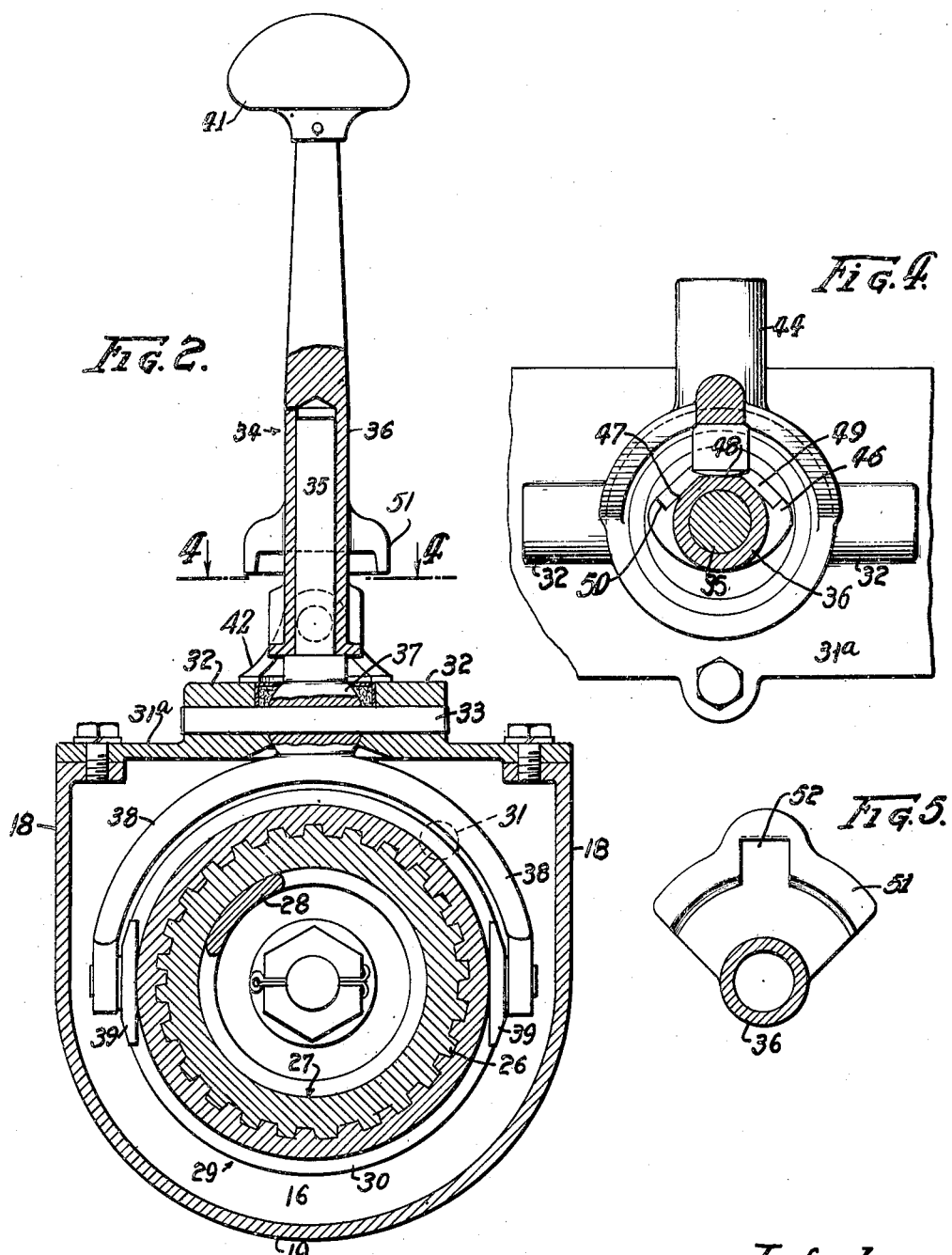

Patented Dec. 11, 1934

1,983,841

UNITED STATES PATENT OFFICE 1,983,841

LOCK-OUT LEVER MECHANISM FOR FREE-WHEELING UNITS

Charles Drexler, Indianapolis, Ind., assignor to L. G. S. Devices Corporation, Indianapolis, Ind., a corporation of Indiana Application October 9, 1931, Serial No. 567,791

7 Claims. (Cl. 192—48)

This invention relates to lock-out lever mechanisms for free wheeling units and it consists of the matters hereinafter described and more particularly pointed out in the appended claims.

The primary object of the invention is to provide a mechanism especially adapted for use in an automotive transmission including a free wheeling clutch for automatically restoring the clutch to free wheeling condition after it has been locked-out by the shifting into reverse.

Another object of the invention is to provide mechanism for use in an automotive transmission including a free wheeling clutch which is adapted to be locked in and locked out, together with means which will automatically restore the previous operative condition when desired.

Another object of the invention is to provide a mechanism of this kind wherein the free wheeling clutch may be secured in lock-out condition so that the associated transmission may be operated in the manner of a conventional non-free wheeling transmission.

A further object of the invention is to provide a simple and efficient lock-out collar shift mechanism, including primary, and secondary lever members, the latter by a slight turning movement on the former, holding them in that position locking the free wheeling clutch in lock-out condition.

The above mentioned objects of the invention as well as others, together with the many advantages thereof, will more fully appear as I proceed with my specification.

In the drawings:—

Fig. 1 is a longitudinal vertical sectional view through the rear end of an automotive transmission embodying my improved mechanism.

Fig. 2 is a transverse vertical sectional view through the same as taken on the line 2—2 of Fig. 1.

Fig. 3 is a horizontal detail sectional view through a part of the mechanism as taken on the line 3—3 of Fig. 1.

Fig. 4 is another horizontal detail sectional view through a part of the mechanism as taken on the line 4—4 of Fig. 2.

Fig 5 is a horizontal detail sectional view on a somewhat enlarged scale through a part of a lever member embodied in the improved mechanism and which will be more fully referred to later.

In general, the improved mechanism is employed in connection with a free wheeling unit disposed at the rear end of an automotive transmission casing and which unit includes, coacting clutch members, a means for clutching said members together in a relative rotation in one direction and a collar shiftable on said members to lock them together independent of said means. Associated with this collar is a lever including lever members, one of which has a yoke engaged with the collar and the other one of which has a limited turnable movement on the first mentioned one.

In actuating the transmission to provide reverse for the driven shaft, a certain gear thereon is shifted rearwardly and in this movement of said gear, the collar above mentioned is automatically shifted to lock-out position. In this movement of said collar, the associated actuating lever is swung in one direction against the action of a spring and when said gear is shifted out of that position providing reverse, said spring acts to move the collar out of lock-out position to restore free wheeling. However, the two members of the lever are so formed that by but a small turning of the one member on the other, the lever as a whole is locked against movement in that direction restoring free wheeling so that the transmission can be used in all respects as a conventional non-free wheeling transmission when so desired.

Referring now in detail to that embodiment of the invention illustrated in the drawings, 1 indicates as a whole the rear end part of the casing of an automotive transmission, which includes a rear end wall 2, a bottom wall 3 and the usual side walls not appearing herein. 4 indicates the cover closing the open top of said casing.

5 indicates the splined rear end portion of the driven shaft of the transmission which is journalled in an antifriction bearing 6 secured in the end wall 2 of the casing. 7 indicates the usual countershaft of the transmission fixed at its rear end in the casing wall and journalled thereon is a sleeve 8 carrying the usual first speed forward and the reverse gears 9 and 10 respectively. The gear 10 meshes with the usual idler gear (not shown). Shiftable on the splined part 5 of the driven shaft is a gear 11 which when shifted forwardly, engages the gear 9 on the countershaft sleeve to provide first speed forward for said driven shaft. When said gear 11 is shifted rearwardly, it engages the idler gear before mentioned as meshing with the gear 10 on the countershaft sleeve, to provide reverse for said driven shaft.

On the rear end of said gear 11 is provided an annular groove 12 to receive the yoke 13 by which said gear is shifted endwise on the driven shaft and this yoke is carried by and depends from a shift rod or rail 14 having suitable bearing in the casing 1. This rod or rail is in turn actuated by the usual shift lever of the transmission not shown herein.

Suitably secured to the rear end wall 2 of the transmission casing, is an open top, free wheeling unit or clutch casing 15 including front and rear end walls 16 and 17 respectively, side walls 18 and a rounded bottom wall 19, the front wall having a bolted on connection with the rear wall of the transmission casing. The rear wall 17 of the casing 15 includes a rearwardly extending hollow boss 20, and disposed in the same is an antifriction bearing 21 in which a secondary driven shaft 22 is journalled. The shaft 22 is connected in any suitable manner to the propeller shaft of the automobile in which the transmission is installed.

That part of the secondary driven shaft 22 disposed in the casing 15 is made to provide a forwardly facing cup like clutch member 23 externally splined on its forward end as at 24. Secured to that end of the driven shaft 5 extending into the casing, is a second but rearwardly facing cup like clutch member 25 also externally splined as at 26. The said clutch members are each provided with an axial recess and both recesses coact to form a pocket 27 for a clutch element 28 in the form of a spring. Said spring is anchored at one end to one of said clutch members and is so operatively engaged at its other end to the other clutch member, that upon a relative rotation of said members in one direction, the spring expands radially to grip the annular wall of the pocket 27 to clutch said clutch members together. Upon a relative rotation between said clutch members in the other direction, the spring contracts radially to release said clutching action and provides the overrunning action now generally spoken of as "free wheeling".

Associated with the clutch members 23—25 is an internally splined lock-out collar 29. This collar which has an annular groove 30 in its periphery, is of an axial length approximating that of the spline teeth 26 on the clutch member 25 and is normally engaged therewith.

When said collar is in this position, it is apparent that the element or spring 28 can function in the manner above mentioned. However, when said collar is shifted rearwardly so as to also engage the spline teeth 24 of the clutch member 23, then said clutch members are connected together independent of said spring. This position is termed the "lock-out" position for said collar.

Means is provided that is operable in shifting the gear 11 in providing reverse as before described, for shifting said collar to lock-out position otherwise there could be no transmission of power from the shaft 5 to the shaft 22. Such a means in this instance comprises a shiftable rod or bar 31 having a sliding bearing in an opening provided therefor in the end wall 2 of the transmission casing. Such a rod or bar is so disposed as to be engaged at its front end by the yoke 13 when the same is moved rearwardly and to engage at its rear end with the front face of the lock-out collar to shift the same from its forward position upon the clutch member 25 to its rearward position engaging both clutch members to lock them together.

Heretofore, when the gear 11 was shifted forwardly out of that position providing reverse, the collar remained in its lock-out position so that when it was desired to restore the free wheeling action of the clutch, it was necessary for the operator to manually shift the collar out of lock-out position. This calls for an extra operation upon the part of the operator and was somewhat confusing for the novice.

To overcome this objection and to automatically return the collar from the lock-out position into which it was moved in providing reverse, to that position permitting free wheeling, I provide the following arrangement:—

The open top of the casing 15 is closed by a cover plate 31a bolted to the casing as best shown in Fig. 1. Said cover plate includes laterally disposed bosses 32 in which is mounted a transverse shaft or pin 33. Pivoted on said pin is a substantially upright actuating lever indicated as a whole by the numeral 34. Said lever includes a primary lever member 35 and a secondary lever member 36, the primary lever including a sphere like portion 37 through which the pin 33 extends. Said primary lever member is formed below the portion 37 to provide oppositely extending yoke arms 38 each carrying a pad 39 to engage in diametrically opposite sides of the groove 30 in the collar 29. It is apparent from the above that when the lever 34 as a whole is swung forwardly, the collar 29 is shifted rearwardly to lock-out position.

The primary lever member 35 is made as a cylindrical stem and is provided a short distance above the portion 37 with a radial shoulder 40. The bottom end of the secondary lever member 36 is made tubular as shown to receive the stem of the lever member 35 and engages at its bottom end upon said shoulder 40. On the top end of said secondary lever member is provided a hand ball or knob 41 by means of which the lever as a whole may be shifted forwardly or rearwardly or by means of which the secondary lever member may be turned in one direction or the other upon the stem within certain limits.

The cover 31a is provided toward the front with an upright extension 42 the top end of which is formed as a tooth 43. Just below this tooth and integral with said extension is a longitudinally extending hollow boss 44 opening toward the rear and disposed in this boss is a spring pressed plunger 45.

The bottom end of the lever part 36 is provided at that side facing the extension 42 of the cover, with a radial flange 46 and just above the same are provided three flat arcuately spaced surfaces 47, 48 and 49 respectively adapted for engagement by the spring pressed plunger 45. As best shown in Fig. 1, the plunger 45 engages on the top surface of the flange 46 and locks the secondary lever member against accidental, longitudinal displacement with respect to the primary lever member 35. The end of the spring pressed plunger 45 normally engages with the middle flat surface 48 and when said lever member 36 is turned, in either direction, the end of said plunger will engage either flat face 47—49 and will releasably hold said member 36 in the turned position upon the lever member 35. In this respect it is pointed out that the turning movement of the member 36 upon the member 35 is limited by stop shoulders 50 on the flange 46 either one of which will engage the associated side of said spring pressed plunger. Should it be desired to remove the member 36 at any time, any convenient tool may be used to depress the plunger 45 into the boss 44 far enough to let the flange 46 pass said plunger.

A suitable distance above the flange 46 there is provided a forwardly extending downwardly facing, arcuate flange 51 having a relatively deep recess 52 midway between its ends.

With the parts in normal operating position, the lever member 36 is so disposed upon the stem of the lever member 35 that the spring pressed plunger 45 normally engages the middle face 48 and the tooth 43 on the cover extension 42 normally engages in the recess 52 of the flange 51.

When the gear member 11 is shifted rearwardly to provide reverse drive for the shaft 5, the yoke 13 engages the push rod 31 and engages same with the collar 29 which is pushed rearwardly into lock-out position wherein it connects both clutch members 23—25 together. This rearward movement of the lock-out collar carries the yoke arms 38 in a rearward direction and swings the lever members 35 and 36 forwardly about the pin 33 as an axis. In this forward swing of said lever parts, the plunger 45 is pressed forwardly into the hollow boss 44 and the notch 52 of the flange 51 passes forwardly to clear the tooth 43.

So soon as the gear 11 is moved out of that position providing reverse, into neutral or first speed forward, as before described, the associated yoke 13 moves away from the push rod 31. The spring for the plunger 45 then expands and acting against the face 48, swings the lever members 35—36 rearwardly and the yoke arms 38 forwardly and this will shift the collar 29 forwardly. In this movement of the collar, it leaves and disengages from the clutch member 23 and assumes its normal position on the clutch member 25. This breaks the positive connection between said clutch members so that in the relative rotation between said clutch members in one direction, the spring 28 again acts automatically to connect said clutch members together. Should the shaft 22 tend to rotate faster than the shaft 5, it will overrun said shaft to provide the free wheeling action before referred to.

Assume now that it is desired to lock-out the clutch when in first speed forward or in fact in any speed afforded by the transmission so that the transmission may be operated in the manner of a conventional non-free wheeling transmission. Under such conditions, the hand ball or knob is grasped and the associated top end of the lever is pushed forwardly. This swings the yoke arms 38 rearwardly and shifts the collar 29 rearwardly into lock-out position wherein the two clutch members 23—25 are positively locked together. In the forward swing of the lever as just above mentioned, the spring for the plunger 45 is compressed as the plunger moves into the boss 44. At this time the tooth 43 will have cleared the recess or notch 52 in the flange 51 of the lever member 36. When said lever member 36 is turned on the stem of the lever member 35, the notch or recess is moved to one side or the other of the plane of the tooth 43 so that said tooth engages behind the flange 51. This turning movement is limited by the engagement of one or the other of the shoulders 50 of the lever member 36 with the side of the plunger 45 at which time the end of said plunger will engage one or the other of the flat faces 47—49 in the manner of a detent according to the manner in which said lever member is turned.

As the tooth 43 is now engaged behind the flange 51 it is apparent that said lever is locked against movement so that the lock-out collar is held in its lock-out position. By employing the faces 47—49, one on each side of the middle face 48, it is apparent that it makes no difference in which way the lever member 36 is turned on the stem of the lever member 35 so far as the locking of the lever is concerned.

With the collar 29 locked in its lock-out position, the transmission is operable as a conventional non-free wheeling transmission in all speeds forward and reverse. When free wheeling is again desired it is only necessary to so turn the lever member as to bring the recess 52 into the plane of the tooth 43, the plunger 45 operating against the flat face 48 to hold said lever in this position. With the parts in this position, the spring for the plunger 45 expands to swing the lever rearwardly, the tooth 43 entering the notch or recess 52 to prevent any further turning of the lever member 36 with respect to the stem of the lever member 35. In this return movement of the lever, the collar 29 is moved out of lock-out position to provide the free wheeling action desired.

With the improved construction as described, the parts may be so disposed that upon shifting out of reverse wherein the free wheeling action was locked-out, the free wheeling action is automatically restored. Again, the free wheeling action may be locked-out of operation in all speeds which the transmission is capable of providing so that in all respects a conventional non-free wheeling transmission is attainable.

The parts described are simple in construction and operate efficiently for their intended purpose.

While in describing the invention, I have referred in detail to the form, arrangement and construction of the various parts, the same is to be considered merely as illustrative so that I do not wish to be limited thereto, except as may be specifically set forth in the appended claims.

I claim as my invention:—

1. A transmission embodying therein a free wheeling clutch including relatively rotatable clutch members and means for operatively connecting them together in a relative rotation in one direction, a collar for locking the two clutch members together for conjoint rotation in either direction shiftable axially on said members from an inoperative position to an operative position, a hand operated lever for moving said collar in one direction from its inoperative position to its operative position, and spring means operating upon a part of said lever for returning the collar from its operative position to its inoperative position, said lever including relatively movable lever members which when so relatively moved, will lock said collar in said operative position against the action of said spring means operating upon a part of said lever.

2. In an automotive transmission of the character described, the combination of a free wheeling clutch comprising relatively rotatable clutch members and an element operating to clutch said members together for rotation in one direction, a shiftable lock-out collar for said clutch, and a hand lever operable in response to swinging thereof to shift said collar in either direction, and spring means operating upon said lever to restore it to normal position, said lever comprising two longitudinally aligned relatively turnable parts one of which when turned in one direction operates to lock said lever against said means operating thereupon to return said collar to said normal position.

3. In a transmission, a casing, an overrunning clutch disposed in the casing and comprising relatively rotatable, externally splined clutch members and associated one way clutching means, an internally splined lock-out collar normally rotative with one clutch member and shiftable thereon to positively connect said clutch members together through the spline teeth, a hand lever for shifting said collar into a position positively connecting said clutch members together, means operating upon the lever when moved in one direction from one position to another to return it to said first mentioned position and coacting means on the lever and casing for holding said lever in said other position against said means operating to return it to the first mentioned position.

4. In a transmission, a casing, an overrunning clutch therein including a lock-out collar, a lever for operating said collar, and means operating upon the lever when moved in one direction from one position to another to return it to said first mentioned position, said lever comprising a pair of longitudinally aligned parts one of which is rotatable on its longitudinal axis relatively to the other and operates in response to turning thereof to engage a part of said casing to lock the lever in said other position against the action of said means operating to return it to the first mentioned position.

5. In a transmission, a casing, an overrunning clutch therein including a shiftable lock-out collar, a lever for shifting said collar from one position to another, including a pair of longitudinally aligned relatively turnable lever parts, spring means operating upon said lever to return the collar from said other position to the first position, one of said relatively turnable lever parts being arranged so that in response to turning thereof relatively to the other part it engages an integral part of the casing and operates to hold the lever in said other position against said means tending to return the same to the first mentioned position.

6. In a transmission, a casing, an overrunning clutch therein including a shiftable lock-out collar, a hand lever shiftable from one position to another and operatively connected to the collar for shifting the same, and spring means carried by the casing and engaging a part of said lever to return it to the first mentioned position, said lever including a second part longitudinally aligned with and turnable on the first to so engage a part of the casing as to prevent return of said lever to said first mentioned position.

7. In a transmission, a casing, a free wheeling unit therein including a lock-out collar, a lever for shifting said collar from one position to another, said lever comprising a stem and a tubular member turnable thereon, a spring pressed plunger carried by the casing and acting upon said lever to return it to the first mentioned position, said plunger also acting to hold the tubular member of the lever on the stem in the desired angular position.

CHARLES DREXLER.